(12) United States Patent
Hariu et al.

(10) Patent No.: US 9,855,989 B2
(45) Date of Patent: Jan. 2, 2018

(54) SADDLE TYPE VEHICLE

(71) Applicant: HONDA MOTOR CO., LTD., Tokyo (JP)

(72) Inventors: Jun Hariu, Wako (JP); Daisuke Umikawa, Wako (JP); Akihiro Yamashita, Wako (JP); Yuzuru Ishikawa, Wako (JP); Shunichi Nakajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 403 days.

(21) Appl. No.: 14/665,076

(22) Filed: Mar. 23, 2015

(65) Prior Publication Data

US 2015/0274251 A1 Oct. 1, 2015

(30) Foreign Application Priority Data

Mar. 26, 2014 (JP) .................................. 2014-063098
Mar. 26, 2014 (JP) .................................. 2014-063100

(51) Int. Cl.
*B62K 25/28* (2006.01)
*B62K 11/04* (2006.01)
*B62K 19/30* (2006.01)

(52) U.S. Cl.
CPC ............ *B62K 25/283* (2013.01); *B62K 11/04* (2013.01); *B62K 19/30* (2013.01); *B62K 25/286* (2013.01)

(58) Field of Classification Search
CPC ............................. B62K 25/283; B62K 11/04
USPC ................................................. 180/219, 227
See application file for complete search history.

(56) References Cited

U.S. PATENT DOCUMENTS

| | | | | |
|---|---|---|---|---|
| 4,511,013 A | * | 4/1985 | Miyakoshi | B62K 25/286 180/227 |
| 4,585,247 A | * | 4/1986 | Takada | B62K 19/22 280/281.1 |
| 4,673,053 A | * | 6/1987 | Tanaka | B62K 25/286 180/227 |
| 4,852,678 A | * | 8/1989 | Yamaguchi | B62K 19/12 180/219 |
| 5,390,758 A | * | 2/1995 | Hunter | B60K 5/1208 180/227 |

(Continued)

FOREIGN PATENT DOCUMENTS

JP 2012-116484 A 6/2012
WO WO 2008/088809 A2 7/2008

*Primary Examiner* — Anne Marie Boehler
(74) *Attorney, Agent, or Firm* — Birch, Stewart, Kolasch & Birch, LLP

(57) ABSTRACT

A saddle type vehicle wherein restrictions in the weight and the layout are reduced for slimmer and lighter vehicle. Pivot plates are provided as separate bodies from seat rails. An upper end of a shock absorber is received by a cross member located between left and right seat rails. The cross member is a separate body from the seat rails. Both ends of the cross member are supported by recesses provided in the left and right seat rails at inner sides of the seat rails so as to face each other. The cross member is fastened to the seat rails by cross member fastening members. The seat rail is attached to a main frame at its one front-side end and to the pivot plate at its other front-side end. The main frame and the seat rail are fastened to each other in the vertical direction by a first fastening member.

17 Claims, 12 Drawing Sheets

(56) References Cited

U.S. PATENT DOCUMENTS

| | | | | |
|---|---|---|---|---|
| 6,290,017 | B1* | 9/2001 | Ito | B62K 11/06 |
| | | | | 180/219 |
| 6,691,814 | B2* | 2/2004 | Toyoda | B62K 25/283 |
| | | | | 180/219 |
| 2006/0196713 | A1* | 9/2006 | Taniguchi | B62K 11/06 |
| | | | | 180/227 |
| 2009/0230654 | A1* | 9/2009 | Yuliang | B62K 11/04 |
| | | | | 280/281.1 |
| 2009/0242305 | A1* | 10/2009 | Asano | F02M 35/162 |
| | | | | 180/219 |
| 2015/0274254 | A1* | 10/2015 | Yamashita | F02M 35/10288 |
| | | | | 180/219 |
| 2016/0264204 | A1* | 9/2016 | Ishii | B62K 11/04 |

\* cited by examiner

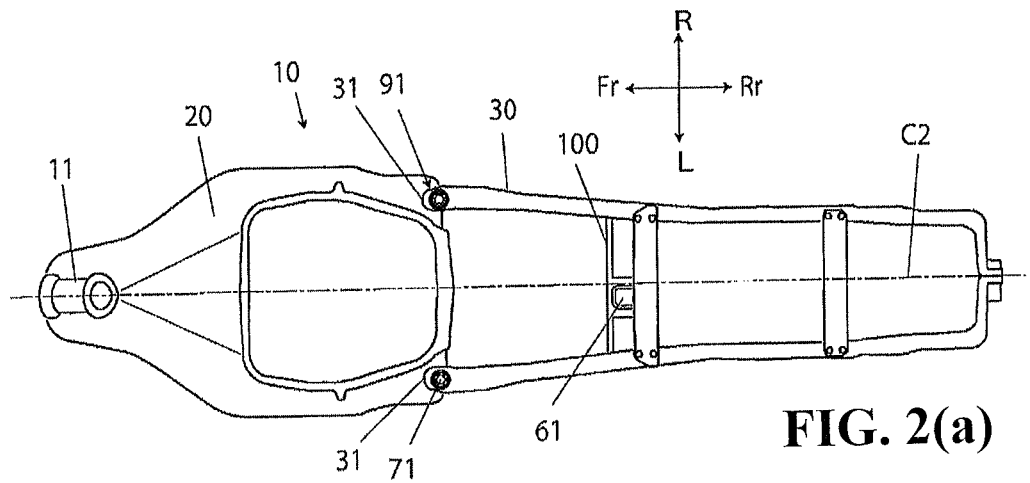
FIG. 2(a)
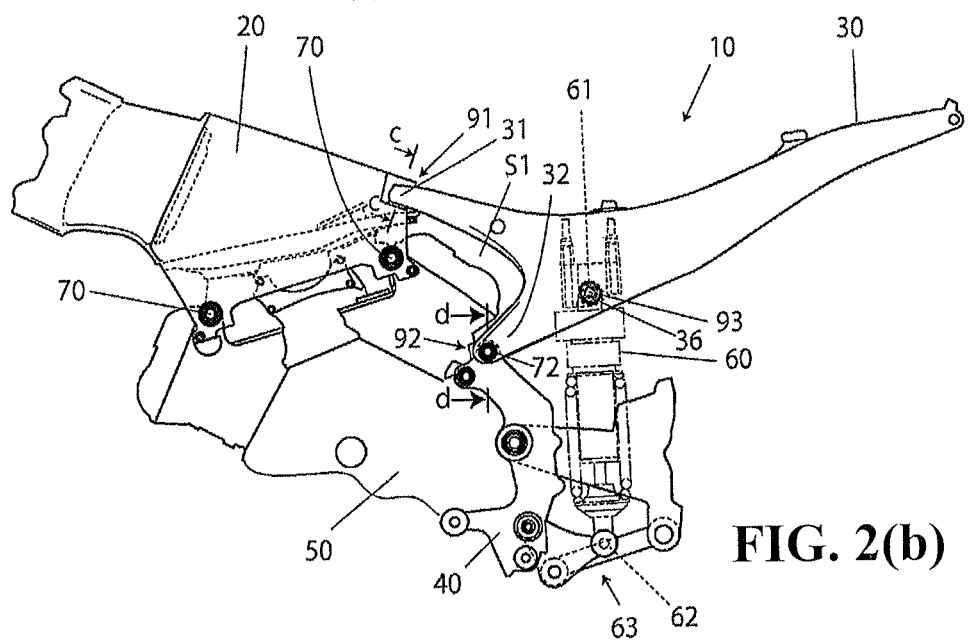
FIG. 2(b)
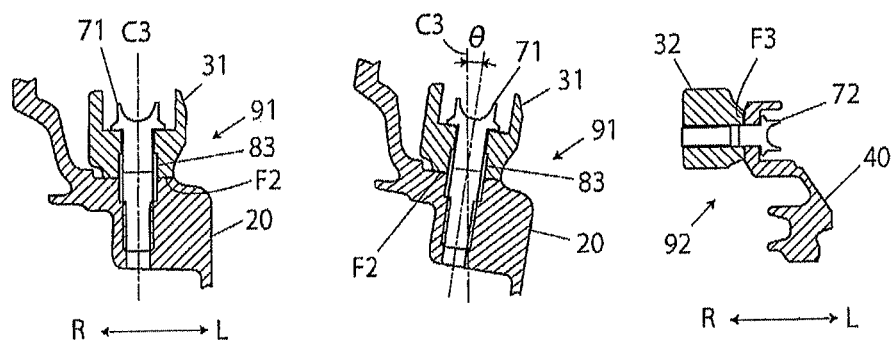
FIG. 2(c)    FIG. 2(c')    FIG. 2(d)

SADDLE TYPE VEHICLE

CROSS-REFERENCE TO RELATED APPLICATIONS

The present application claims priority under 35 USC 119 to Japanese Patent Application No. 2014-063098 filed Mar. 26, 2014 and Japanese Patent Application No. 2014-063100 filed Mar. 26, 2014 the entire contents of which are hereby incorporated by reference.

BACKGROUND OF THE INVENTION

1. Field of the Invention

The present invention relates to a saddle type vehicle.

2. Description of Background Art

A saddle type vehicle is known wherein a split frame structure is divided into front and rear frame members. The load on a shock absorber is received by the rear frame member. See, for example, Japanese Patent Laid-Open No. 2012-116484. The rear frame member, wherein pivot plates and a shock absorber load receiving part are both integral with seat rails, is high in strength.

In the conventional saddle type vehicle mentioned above, on the one hand, the rear frame member is high in strength. On the other hand, however, the structure wherein the pivot plates and the shock absorber load receiving part are both integral with the seat rails involves many restrictions with regard to the weight and layout. This has been a serious problem in manufacturing a finished vehicle that is slim, light in weight and attractive.

SUMMARY AND OBJECTS OF THE INVENTION

It is an object of an embodiment of the present invention to provide a saddle type vehicle wherein restrictions regarding the weight and layout can be reduced and which can be made slimmer and lighter in weight.

According to an embodiment of the present invention, there is provided a saddle type vehicle that includes a head tube (11), a main frame (20) extending rearwardly from the head tube (11) with left and right seat rails (30) adapted to support a seat (2). The seat rails (30) are provided as separate bodies from the main frame (20) and are located rearwardly of the main frame (20). A swing arm (5) is adapted to support a rear wheel (WR) with pivot plates (40) adapted to support a pivot (41) serving as a center of swinging of the swing arm (5). A shock absorber (60) is provided for suppressing vibrations attributable to a road surface. In the saddle type vehicle, the pivot plates (40) are provided as separate bodies from the seat rails (30). An upper end (61) of the shock absorber (60) is received by a cross member (100) located between the left and right seat rails (30).

Since the pivot plates and the seat rails are separate bodies from each other, restrictions with regard to the weight and layout can be reduced. Therefore, the saddle type vehicle can be made slimmer and lighter in weight.

According to an embodiment of the present invention, there is provided another saddle type vehicle which also includes a head tube (11), a main frame (20) extending rearwardly from the head tube (11) with left and right seat rails (30) adapted to support a seat (2). The seat rails (30) are provided as separate bodies from the main frame (20) and are located rearwardly of the main frame (20). A swing arm (5) is adapted to support a rear wheel (WR) with pivot plates (40) adapted to support a pivot (41) serving as a center of swinging of the swing arm (5). A shock absorber (60) is provided for suppressing vibrations attributable to a road surface. In this saddle type vehicle, an upper end (61) of the shock absorber (60) is received by a cross member (100) located between the left and right seat rails (30). In addition, the cross member (100) is a separate body from the seat rails (30) with both ends of the cross member (100) being supported by recesses (35) provided in the left and right seat rails (30) at inner sides of the seat rails (30) so as to face each other. The cross member (100) is fastened to the seat rails (30) by cross member fastening members (73).

Since the cross member for receiving an upper end of the shock absorber is a separate body from the seat rails, the material of the cross member, on which the load from the shock absorber acts directly, can be made to be different from the material of the seat rails. Therefore, it is possible, by raising the rigidity of only the cross member, to further lighten the overall weight of the vehicle, and to enhance productivity.

Since the cross member, which receives the upper end of the shock absorber, and the seat rails are separate bodies from each other, the cross member and the seat rails can be produced using respective molds which are different in a mold parting direction.

Therefore, a required strength can be secured while realizing a lighter overall weight.

More specifically, according to an embodiment of the present invention, a configuration may be adopted wherein the seat rails are each molded using a mold whose mold parting direction coincides with a vehicle width direction, whereas the cross member is composed of an extruded member or is produced using a mold whose mold parting direction coincides with a vertical direction or a longitudinal vehicle direction. In this case, the mold parting direction relevant to the cross member can be substantially conformed to a direction in which the load from the shock absorber is received. Therefore, a required strength can be secured while rendering the cross member lighter in weight. On an overall structure basis, also, a required strength can be secured while realizing a lighter weight.

In addition, according to an embodiment of the present invention, a configuration may be adopted in which the shock absorber is connected to the cross member by a shock absorber connecting member provided along the vehicle width direction with the seat rail being provided therein with a tool insertion hole on an extension line of an axis of the shock absorber connecting member.

This configuration ensures that the shock absorber can be easily removed while operating from an outer side in the vehicle width direction, by way of the tool insertion hole provided in the seat rail.

According to an embodiment of the present invention, the shock absorber may be disposed in a position with an offset from a vehicle body center line toward a side from which the shock absorber connecting member is inserted.

In this case, the shock absorber can be further easily removed while operating from the outer side in the vehicle width direction, by way of the tool insertion hole provided in the seat rail.

According to an embodiment of the present invention, a configuration may be adopted wherein the cross member is provided, on outer sides in the vehicle width direction of its connecting portion for connection to the shock absorber, with left and right lightening holes which are different in size. The lightening holes are each provided with a rib on a diagonal line thereof with a thickness of the rib of the larger lightening hole being greater than a thickness of the rib of the smaller lightening hole.

This configuration makes it possible to restrain deformation of the cross member, which is liable to be inclined due to the load inputted from the shock absorber disposed with an offset as aforementioned.

According to an embodiment of the present invention, the cross member fastening members may be mounted substantially in parallel to an axis of the shock absorber in side view.

This ensures that the load from the shock absorber can be efficiently received by the cross member and the seat rails.

According to an embodiment of the present invention, a configuration may be adopted wherein the seat rail is attached to the main frame at one front-side end thereof and to the pivot plate at another front-side end thereof with a lower end of the shock absorber being attached to an engine and the swing arm by way of a link member.

This configuration ensures that mounting of the seat rails to the engine, which is a rigid member, can be avoided. This, together with the fact that the lower end of the shock absorber is attached to the engine and the swing arm through the link member, makes it possible to secure shock absorbering properties in the vehicle as a whole.

According to an embodiment of the present invention, the seat rail is attached to the main frame at one front-side end thereof and to the pivot plate at another front-side end thereof. The main frame and the seat rail are provided with a first fastening portion where they are fastened to each other in a vertical direction by a first fastening member. The pivot plate and the seat rail are provided with a second fastening portion where they are fastened to each other along a vehicle width direction by a second fastening member.

In the case where the pivot plates and the seat rails are separate bodies from each other as above-mentioned, if a structure in which an upper end of the shock absorber is supported by the seat rails, for example, is adopted, the following problem would be generated. When a high load from the shock absorber is inputted to the seat rails, fitting surfaces in the fastening portions where the seat rails are fastened to the main frame and the pivot plates may slip relative to each other, depending on the fastening structure. In such a situation, changes in dimension or in the rigidity of fastening may be brought about.

On the other hand, according to an embodiment of the present invention, this saddle type vehicle has a structure wherein the seat rail is attached to the main frame at one front-side end thereof and to the pivot plate at the other front-side end thereof. In addition, the main frame and the seat rail are provided with the first fastening portion where they are fastened to each other in the vertical direction by the first fastening members. Also, the pivot plate and the seat rail are provided with the second fastening portion where they are fastened to each other in the vehicle width direction by the second fastening member. This means that the seat rail is provided with the first and second fastening portions for fastening in different directions, namely, in the vertical direction and the vehicle width direction. Even when a high load is inputted, therefore, relative slippages on the fitting surfaces in the fastening portions would not easily be generated. Accordingly, changes in dimension or in the rigidity of fastening can be restrained effectively.

In the saddle type vehicle, according to an embodiment of the present invention, the upper end of the shock absorber is connected to the seat rail by an upper end connecting portion. The first fastening portion, the second fastening portion, and the upper end connecting portion are arranged in this order from a front side of the vehicle, in side view.

This configuration ensures that when a load from the shock absorber is inputted to the seat rail, the action of a force tending to rotate the seat rail about the second fastening portion where the fastening is in the vehicle width direction can be favorably received by the first fastening portion where the fastening is in the vertical direction.

In the saddle type vehicle, according to an embodiment of the present invention, either the first fastening portion or the second fastening portion is provided with a knock pin.

According to this configuration, either the first fastening portion or the second fastening portion can be freed from the possibility that a slipping load would be exerted on the fitting surfaces therein. In addition, with the knock pin provided in only one of the first fastening portion and the second fastening portion, it is possible to absorb discrepancies among component parts.

In the saddle type vehicle, according to an embodiment of the present invention, the knock pin is provided in the first fastening portion.

In this configuration, since the fastening in the first fastening portion is made in the vertical direction by the first fastening member, the knock pin can easily be put in position from above. Accordingly, enhanced workability is secured.

In the saddle type vehicle, according to an embodiment of the present invention, the upper end connecting portion for the shock absorber is provided on a cross member located between the left and right seat rails. The cross member is a separate body from the seat rails, has both its ends supported by recesses which are provided in the left and right seat rails at inner sides of the seat rails so as to face each other, and is fastened to the seat rail by a cross member fastening member.

In this configuration, since the cross member which receives the upper end of the shock absorber is a separate body from the seat rails, the material of the cross member (on which the load from the shock absorber acts directly) can be made different from the material of the seat rails. Accordingly, it is possible, by raising the rigidity of only the cross member, to lighten the overall weight of the vehicle, and to enhance productivity.

In the saddle type vehicle, according to an embodiment of the present invention, the seat rail is produced using a mold whose mold parting direction coincides with the vehicle width direction, and the cross member is produced using a mold whose mold parting direction coincides with the vertical direction.

Where the cross member, which receives the upper end of the shock absorber, and the seat rails are separate bodies from each other, the cross member and the seat rails can be produced using respective molds which are different in mold parting direction.

Therefore, a required strength can be secured while realizing a lighter overall weight.

More particularly, a configuration may be adopted wherein the seat rails are each molded using a mold whose mold parting direction coincides with the vehicle width direction, whereas the cross member is produced using a mold whose mold parting direction coincides with the vertical direction. In this case, the mold parting direction relevant to the cross member can be substantially conformed to the direction in which the load from the shock absorber is received. Therefore, a required strength can be secured while rendering the cross member lighter in weight. On an overall structure basis, also, a required strength can be secured while realizing a lighter weight.

In the saddle type vehicle, according to an embodiment of the present invention, the seat rail is Y-shaped in a side view, and the first fastening portion and the second fastening portion are provided at end portions of arms of the Y-shape.

In this case, the portion between the arms of the Y-shape is made to be void, whereby the seat rail can be made lighter in weight.

In the saddle type vehicle, according to an embodiment of the present invention, the first fastening member is so configured that fastening at the first fastening portion is made obliquely from the outside toward the inside in the vehicle width direction, as viewed from a front side of the vehicle.

This configuration facilitates the fastening operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(a) to 2(d) illustrate frame structures in the embodiment, wherein 2(a) is a partly omitted plan view, 2(b) is a side view, 2(c) and 2(c') are sectional views taken along line c-c in 2(b), and 2(d) is a sectional view taken along line d-d in 2(b);

FIG. 5(b) is a partly omitted sectional view taken along line 5b-5b in FIG. 3;

FIG. 8(b) is an exploded perspective view of the seat rails;

DETAILED DESCRIPTION OF THE PREFERRED EMBODIMENTS

Figure 1:
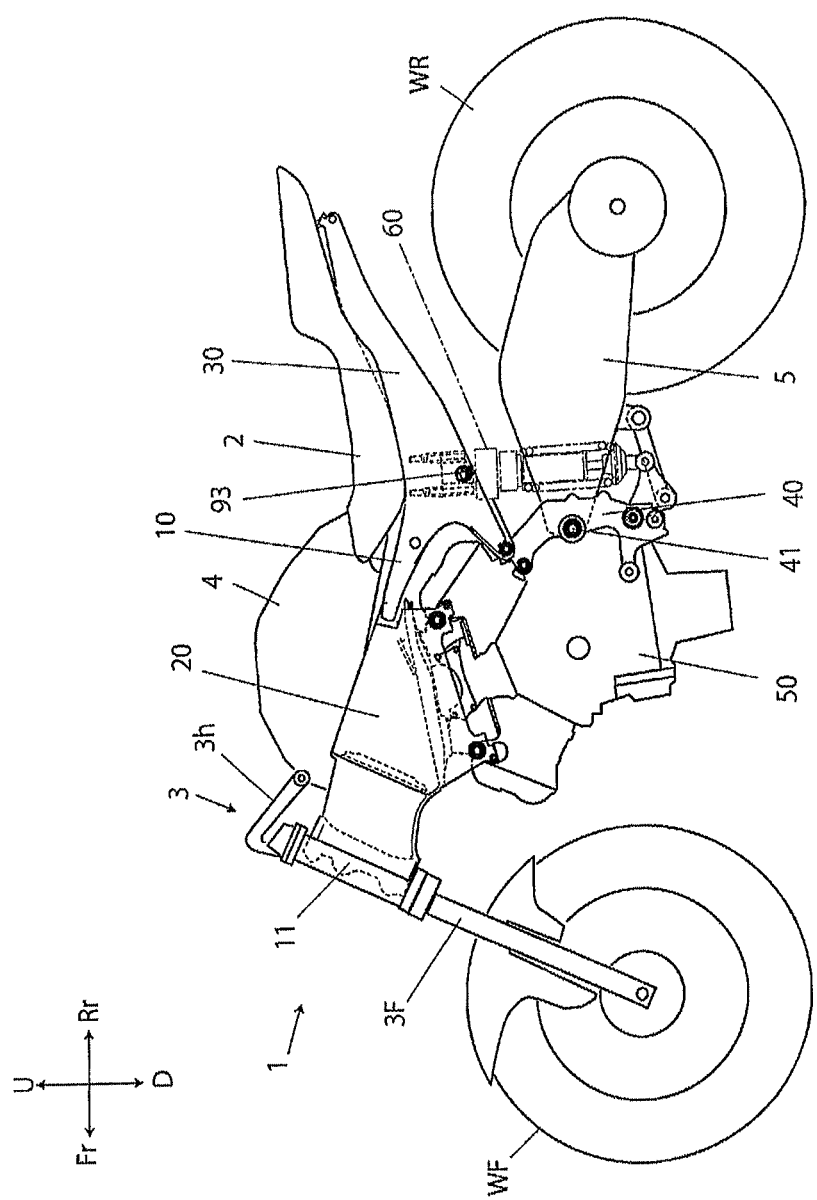
FIG. 1 is a side view showing one embodiment of a saddle type vehicle of the present invention.

An embodiment, disclosed by way of example, of the saddle type vehicle according to the present invention will now be described below referring to the drawings, which should be viewed in accordance with the orientation of reference symbols. In the following description, the front, rear, left, right, upper, and lower sides are those sides (directions) as viewed from a rider. If necessary, the front side of the vehicle in the drawing will be indicated as Fr, the rear side as Rr, the left side as L, the right side as R, the upper side as U, and the lower side (downward side) as D. In the drawings, the identical or corresponding parts are denoted by the same reference symbol.

A saddle type vehicle depicted in FIG. 1 is a motorcycle includes a body frame 10.

The body frame 10 includes a head tube 11, a main frame 20 extending rearwardly from the head tube 11, seat rails 30 disposed rearwardly of the main frame 20 to support a seat 2, and pivot plates 40 linked to the seat rails 30.

A steering system 3 including a handlebar 3h and a front fork 3f are supported on the head tube 11 in a rotatable manner. A front wheel WF is rotatably supported on lower ends of the front fork 3f.

A fuel tank 4 is mounted to an upper portion of the main frame 20.

A swing arm 5 swingable about a pivot 41 is mounted to the pivot plates 40 through the pivot 41. A rear wheel WR is mounted to a rear end of the swing arm 5 in a rotatable manner.

An engine 50 for driving the rear wheel WR is provided with a shock absorber 60 for suppressing vibrations attributable to a road surface.

Figure 3:
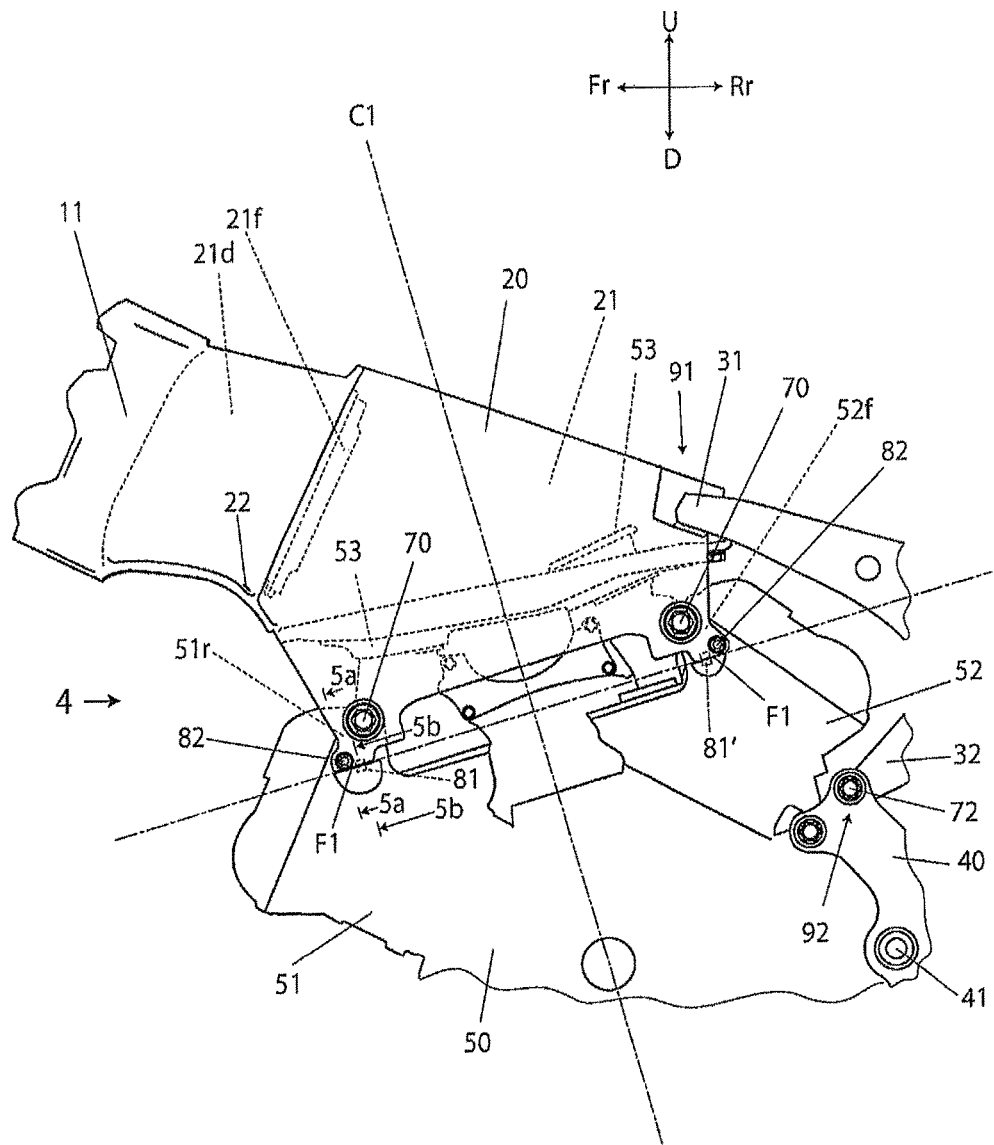
FIG. 3 is a side view showing mainly a main frame.
Figure 4:
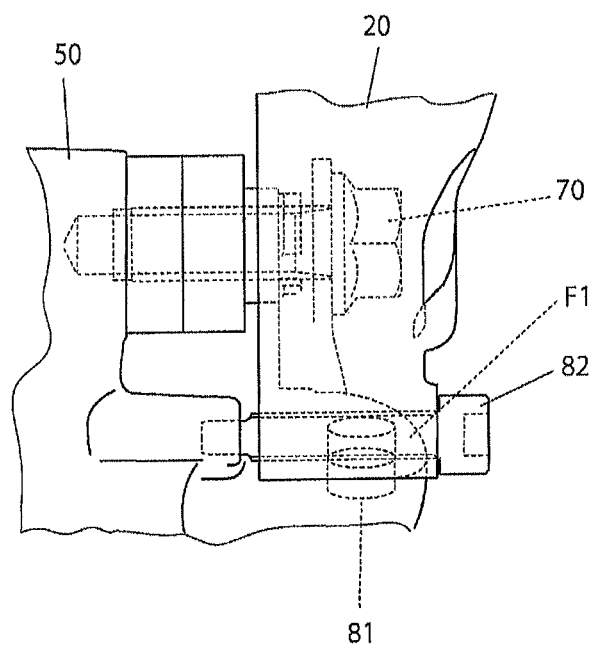
FIG. 4 is a partly omitted view as viewed along arrow 4 in FIG. 3.

As shown in FIGS. 3 and 4, the main frame 20 is fastened to the engine 50 by fastening members 70 that are provided to extend from outside toward inside along the vehicle width direction. The fastening members 70 may be constituted of bolts.

In the vicinity of the fastening member or members 70, a knock pin or pins (81 or/and 81') are provided between the main frame 20 and the engine 50. The knock pin or pins may be provided in at least one position in the vicinity of the fastening member or members 70. More specifically, the knock pins may be provided in a total of four positions, front left, front right, rear left, and rear right positions with respect to the main frame 20.

As shown also in FIGS. 2(a) to 2(d), the main frame 20 and the seat rails 30 are separate bodies from each other, and the fastening members 70 are provided on only the main frame 20. The fastening members 70 are provided in a total of four positions, specifically, in front left, front right, rear left, and rear right positions, of a lower portion of the main frame 20. While the fastening members 70 in front and rear positions on the left side are appearing in FIG. 3, the same structural feature applies also to the right side.

In this exemplary embodiment, first knock pins 81 oriented in a direction orthogonal to the vehicle width direction and/or second knock pins 82 oriented in the vehicle width direction are provided as the knock pin.

The first knock pins 81 are provided respectively downwardly of the fastening members 70, at two front-side ones or two rear-side ones of the fastening members 70 provided in the four positions, specifically, in the front left, front right, rear left, and rear right positions, of the lower portion of the main frame 20. The first knock pins 81 are provided in two front positions (only one front position on the left side is shown in FIG. 3) of the lower portion of the main frame 20. As indicated by imaginary line 81' in FIG. 3, however, the first knock pins 81 may be provided in two rear positions (only one rear position on the left side is shown in FIG. 3) of the lower portion of the main frame 20.

Figures 5A, 5B:
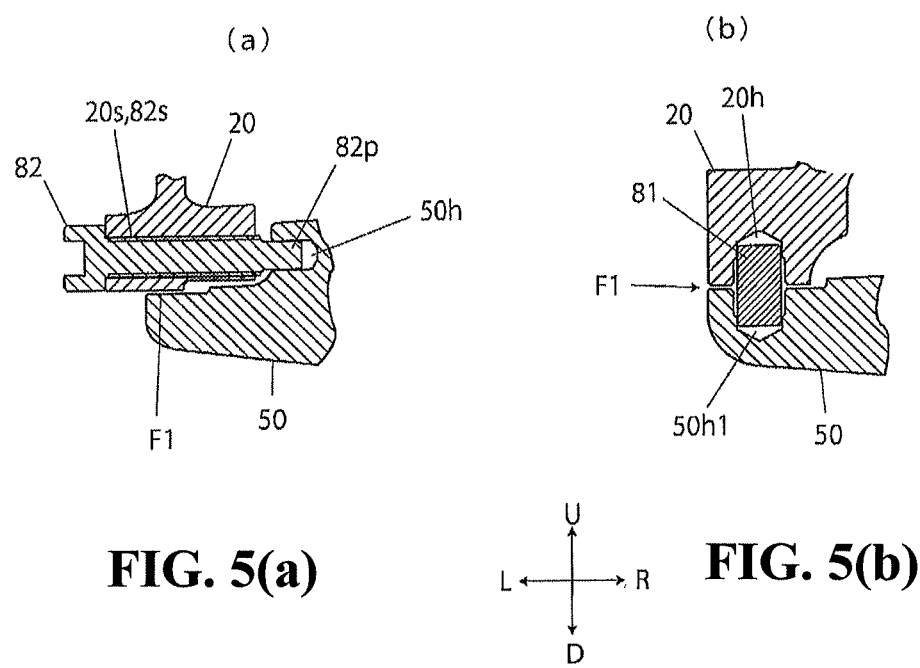
FIGS. 5(a) and 5(b) are partly omitted sectional views taken along line 5a-5a in FIG. 3.

As depicted in FIG. 5(b), the first knock pin 81 is fitted in both a fitting hole 20h provided in the main frame 20 and a fitting hole 50h1 provided in the engine 50.

The second knock pins 82 are provided respectively downwardly of the fastening members 70 provided in the four positions, specifically, in the front left, front right, rear left, and rear right positions of the lower portion of the main frame 20. As depicted in FIG. 5(a), each second knock pin 82 includes a male screw portion 82s for screw coupling with a female screw portion 20s provided in the main frame 20, and a fitting portion (pin portion) 82p for fitting to a fitting portion 50h provided in the engine 50.

As shown in FIG. 3, the first knock pin 81 is provided between the fastening member 70 and the second knock pin 82 in the longitudinal vehicle direction.

The engine 50 has a V-bank shape in which cylinders 51 and 52 are arranged in a V-shape in a side view. A rear portion 51r of a front bank 51 and a front portion 52f of a rear bank 52 are fastened to the main frame 20 by the fastening members 70. The fastening member 70, the first knock pin 81, and the second knock pin 82 are disposed in this order along a direction from a center line C1 of the V-bank shape toward an outer side in the longitudinal vehicle direction.

As illustrated in FIG. 3, the motorcycle in this exemplary embodiment has a mating surface F1 (see FIG. 5(b)) between the main frame 20 and the engine 50, at which the first knock pin 81 is housed, in a total of four positions, specifically, in front left, front right, rear left, and rear right positions (only two positions on the left side are shown in FIG. 3). In addition, the mating surface F1 and the center line C1 of the V-bank shape are orthogonal to each other in side view.

Figure 6:
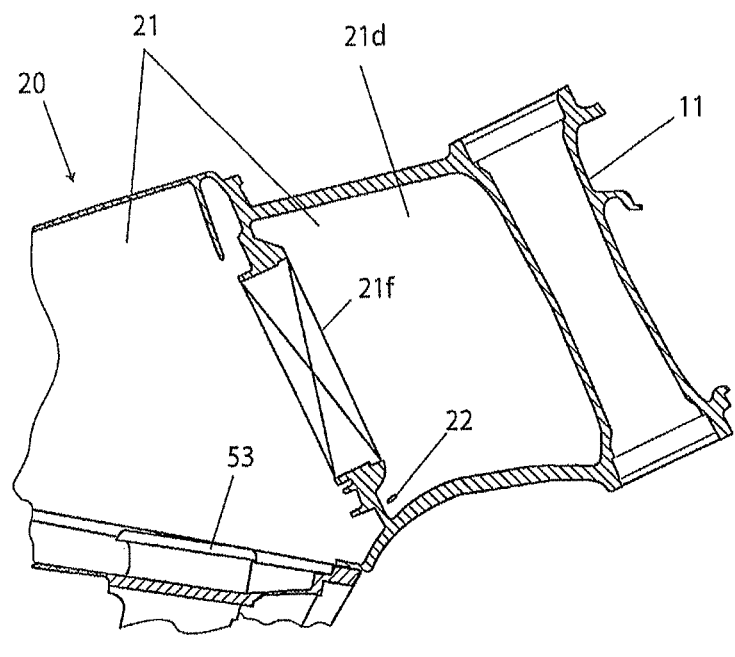
FIG. 6 is a partly omitted sectional view of the main frame (a partly omitted sectional view taken along line 6-6 in FIG. 7)
Figure 6:
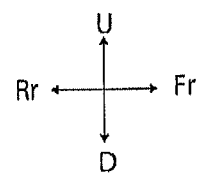

An intake funnel 53 is provided between the cylinders 51 and 52 arranged in the V-shape in side view. The intake funnel 53 opens into an air cleaner case 21 (see FIG. 6) formed inside the main frame 20. A dirty side 21d of the air cleaner case 21 is provided with a water drain hole 22 through which to release water that would otherwise tend to accumulate in the dirty side 21d.

Figure 7:
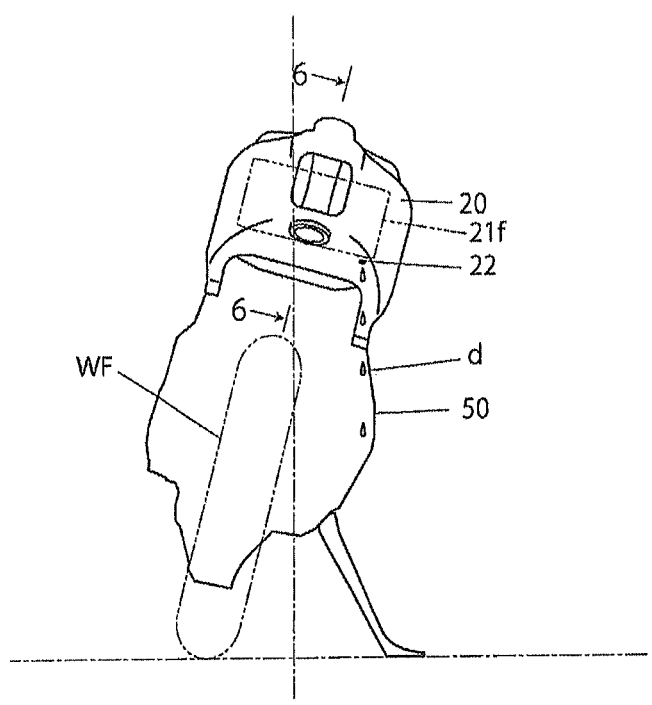
FIG. 7 is a schematic front view of a frame for illustrating an operation.

The water drain hole 22 is provided below a filter paper or sponge of a filter element 21f. This ensures that the filter paper or sponge of the filter element 21f can be prevented from being submerged. In addition, as illustrated in FIG. 7 also, the water drain hole 22 is provided at such a position so as to be situated at a lower end portion of the dirty side 21d at the time of side-stand parking. In FIG. 7, water drops "d" are discharged via the water drain hole 22.

Figure 8A:
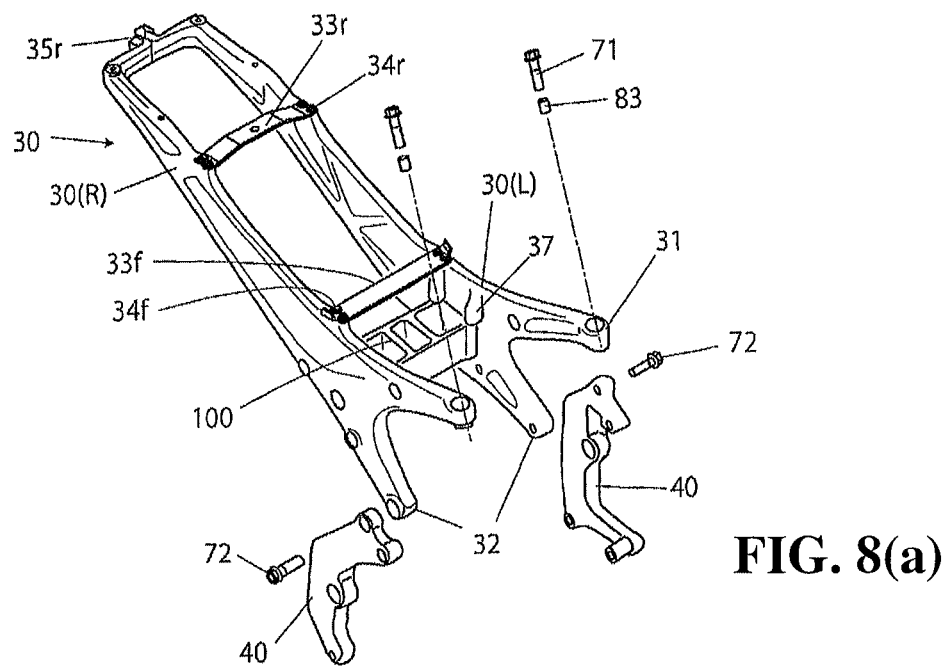
FIGS. 8(a) and 8(b) are perspective views of seat rails and pivot plates.

As depicted in FIG. 8(a), the pivot plates 40 are provided as separate bodies from the seat rails 30.

Figure 8B:
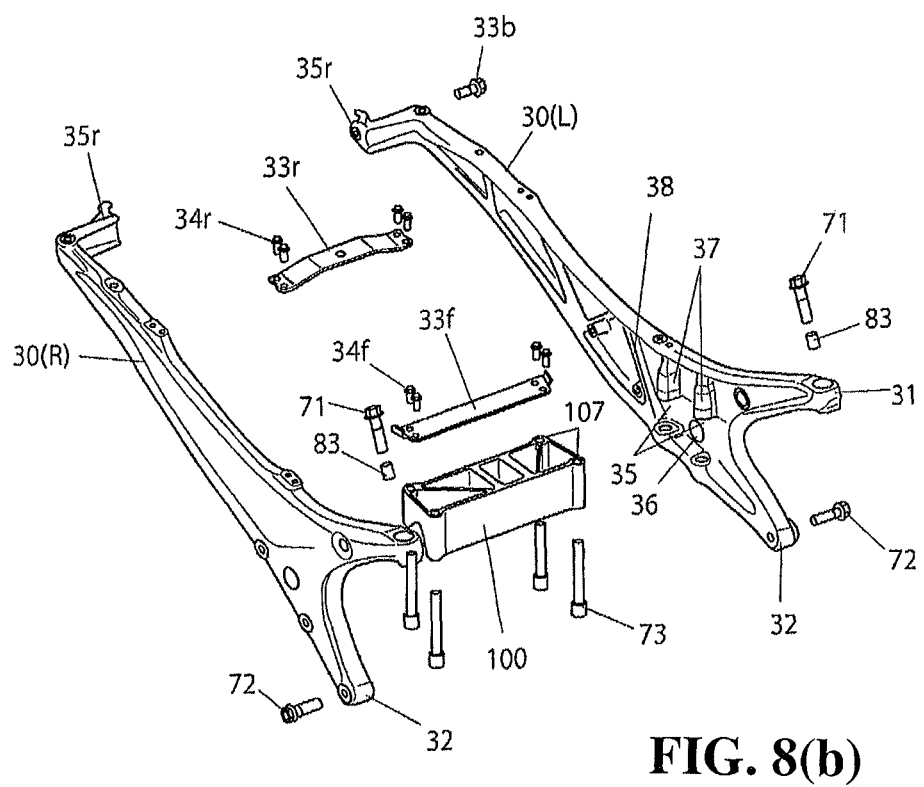

As shown in FIGS. 8(a) and 8(b), the seat rails 30 are configured by connecting the left and right seat rails 30(L) and 30(R) to each other by a front cross plate 33f, a rear cross plate 33r, a rear end connection bolt 33b, and a cross member 100 which will be described later.

The front cross plate 33f is designed to couple upper front portions of the left and right seat rails 30(L) and 30(R) to each other by a fastening bolt 34f.

The rear cross plate 33r is adapted to couple upper rear portions of the left and right seat rails 30(L) and 30(R) to each other by a fastening bolt 34r.

The rear end connection bolt 33b is configured to couple rear end fastening portions 35r of the left and right seat rails 30(L) and 30(R) to each other.

As shown in FIGS. 8(a), 8(b) as well as FIGS. 2(a) to 2(d) and FIG. 3, the seat rail 30 is attached to the main frame 20 at one front-side end 31 thereof and to the pivot plate 40 at another front-side end 32 thereof.

The main frame 20 and the seat rail 30 are provided with a first fastening portion 91 where they are fastened to each other in the vertical direction by a first fastening member 71.

The first fastening member 71 is provided in the vertical direction, as depicted in FIG. 2(c), as viewed from the front side of the vehicle. Note that the first fastening portion 91 may be fastened in an oblique direction from outside toward inside in the vehicle width direction, as illustrated in FIG. 2(c'). The angle of inclination of this oblique direction from the vertical direction is represented by θ.

The pivot plate 40 and the seat rail 30 are provided with a second fastening portion 92 where they are fastened to each other along the vehicle width direction by a second fastening member 72.

As illustrated in FIGS. 2(a) to 2(d), an upper end 61 of the shock absorber 60 is connected to the seat rail 30 by an upper end connecting portion 93. The first fastening portion 91, the second fastening portion 92, and the upper end connecting portion 93 are arranged in this order from the front side of the vehicle, in a side view.

Either the first fastening portion 91 or the second fastening portion 92 is provided with a knock pin 83. As shown in FIGS. 2(c) and 2(c'), in this exemplary embodiment, the knock pin 83 is provided in the first fastening portion 91. The knock pin 83 is a sleeve-shaped pin in which to insert the first fastening member 71.

Figure 9:
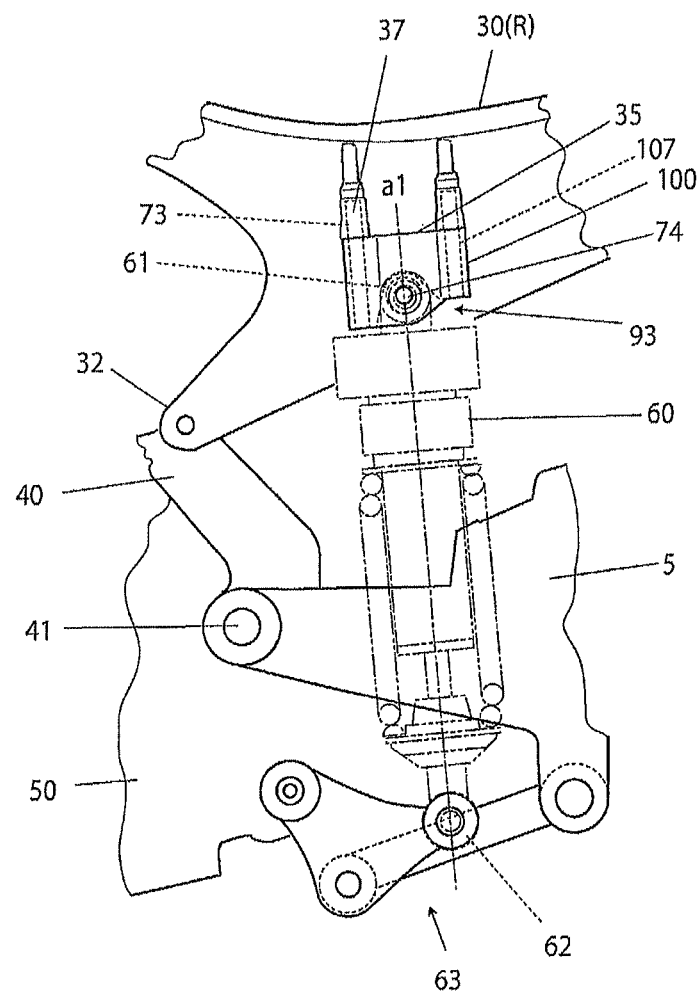
FIG. 9 is a side view depicting a mounting structure for a shock absorber.

As shown in FIGS. 8(a), 8(b), and 9, the upper end connecting portion 93 for the shock absorber 60 is provided on the cross member 100 located between the left and right seat rails 30(L) and 30(R).

Figure 11:
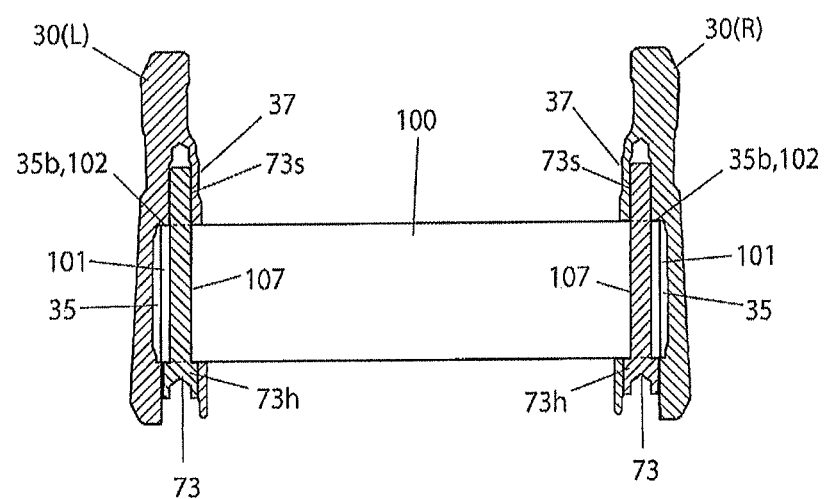
FIG. 11 is a sectional view depicting a mounting structure for a cross member.

The cross member 100 is a separate body from the seat rails 30. As depicted in FIG. 11, both ends 101 of the cross member 100 are supported by recesses 35 which are provided in the left and right seat rails 30(L) and 30(R) at inner sides of the seat rails so as to face each other. In addition, the cross member 100 is fastened to the seat rails 30 by cross member fastening members 73.

An upper surface 35b of the recess 35 forms a fitting surface. An upper surface 102 of the cross member 100 makes contact with this fitting surface 35b.

The cross member fastening member 73 provides a screw coupling with a screw receiving portion 37, which is provided in an upper portion of the seat rail 30, only at a tip portion 73s thereof. On the other hand, a non-tip portion and a head portion 73h of the cross member fastening member 73 are fitted to a through-hole 107 (provided in the cross member 100) and a lower portion of the seat rail 30.

The seat rails 30 are each produced using a mold whose mold parting direction coincides with the vehicle width direction (L-R direction). On the other hand, the cross member 100 is composed of an extruded member or is produced using a mold whose mold parting direction coincides with the vertical direction (U-D direction).

As illustrated in FIGS. 1 and 2(a) to 2(d), the seat rail 30 is Y-shaped in side view. The first fastening portion 91 and the second fastening portion 92 are provided at end portions of the arms of the Y-shape.

Figure 10:
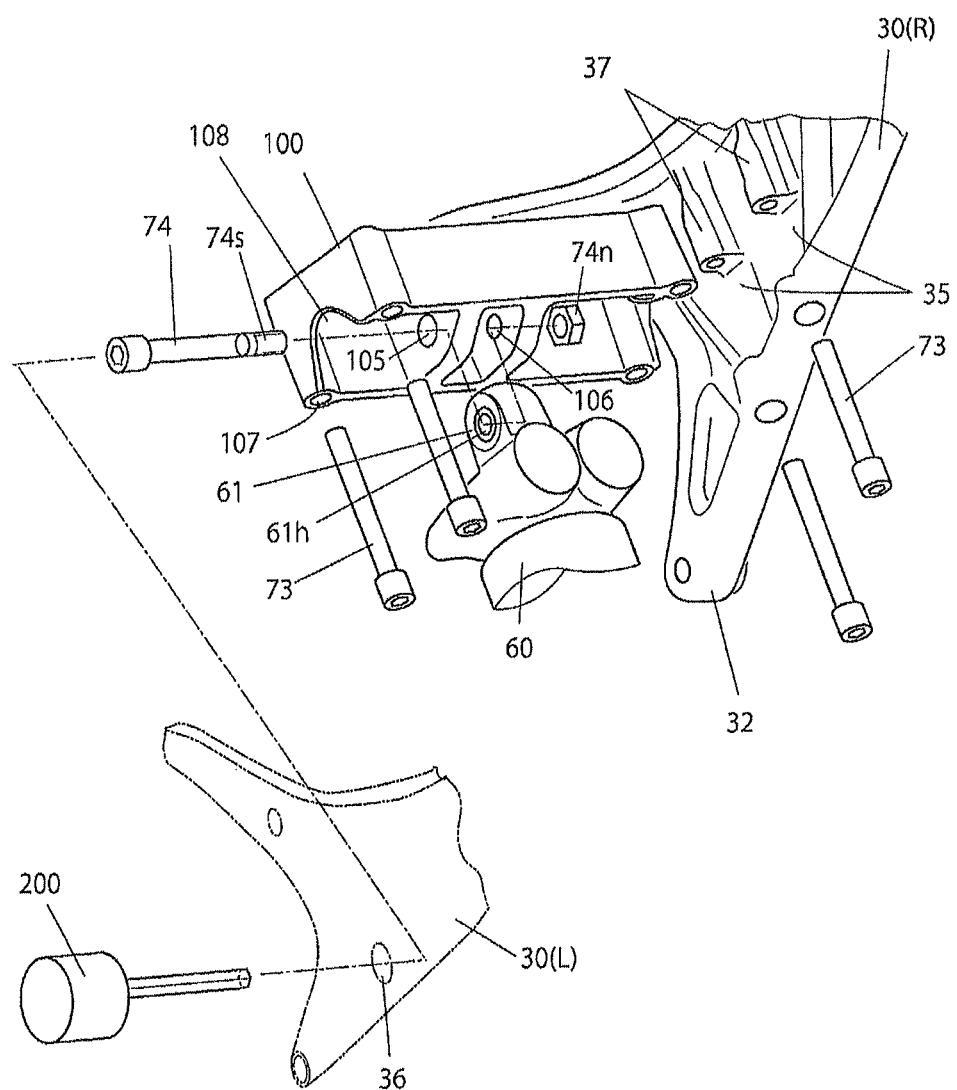
FIG. 10 is a perspective view showing an upper part mounting structure for the shock absorber.

As shown in FIGS. 9 and 10, the shock absorber 60 is connected to the cross member 100 by a shock absorber connecting member 74 provided along the vehicle width direction.

On an extension line in the axial direction of the shock absorber connecting member 74, the seat rail 30 (the seat rail 30(L) on the left side in this embodiment) is provided therein with a tool insertion hole 36, as depicted in FIGS. 2(b) and 8(b).

The shock absorber connecting member 74 is a bolt, which is inserted via the tool insertion hole 36 provided in the left seat rail 30(L) toward the cross member 100, and is passed through a insertion hole 105 in the cross member 100, through a hole 61h at the upper end 61 of the shock absorber 60, and through a through-hole 106 in the cross member 100. A screw portion 74s at the tip of the shock absorber connecting member 74 is screw-coupled to a nut 74n.

In FIG. 10, a tool 200 is illustrated with a tool passing recess 108 provided to pass through the tool 200 in the cross member 100.

Figures 12A, 12B:
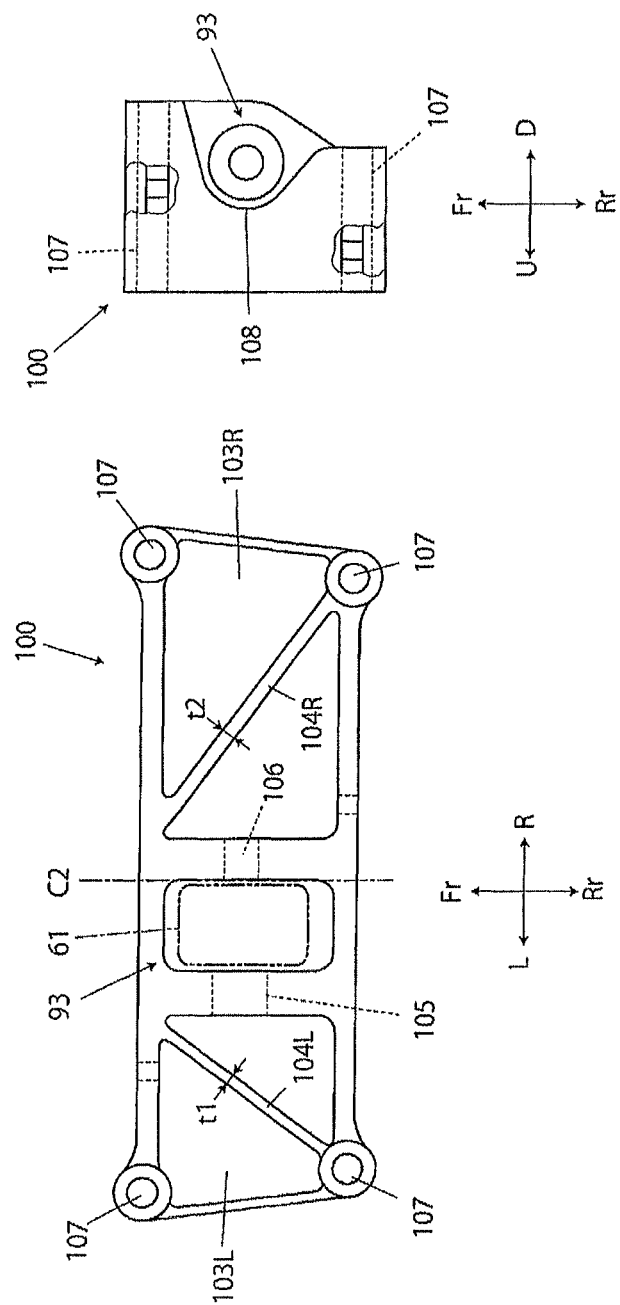
FIGS. 12(a) and 12(b) illustrate the cross member, wherein 12(a) is a plan view, and 12(b) is a right side view relevant to 12(a).

As illustrated in FIGS. 2(a) and 12(a), the shock absorber 60 is disposed in a position with an offset from a vehicle body center line C2 toward the side from which the shock absorber connecting member 74 is inserted (the left side in the illustrated embodiment).

As depicted in FIGS. 12(a) and 12(b), the cross member 100 is provided, on outer sides in the vehicle width direction of its connecting portion 93 for connection to the shock absorber 60, with left and right lightening holes 103L and 103R which are different in size. The lightening holes 103L and 103R are provided with ribs 104L and 104R on a diagonal line, respectively.

A thickness t2 of the rib 104R of the larger lightening hole 103R is greater than a thickness t1 of the rib 104L of the smaller lightening hole 103L.

As shown in FIG. 9, the cross member fastening member 73 is mounted substantially in parallel to an axis a1 of the shock absorber 60 in side view.

As depicted in FIG. 9, a lower end 62 of the shock absorber 60 is attached to the engine 50 and the swing arm 5 through a link member 63.

According to the saddle type vehicle configured as above-described, the following operational advantages are obtained.

(1) Since the main frame 20 is fastened to the engine 50 by the fastening members 70 each provided along the direction from the outside toward the inside in the vehicle width direction, the direction of operation in fastening the main frame 20 and the engine 50 together is in the vehicle width direction. This leads to a better workability and an enhanced productivity.

If the fastening members 70 are merely provided along the vehicle width direction, loads generated in the longitudinal vehicle direction at the time of such operations as starting and stopping of the vehicle are received by those portions of the fastening members 70 which are perpendicular to the axial direction of the fastening members 70 (the belly portions). In that case, the fastening members 70 themselves are required to be high in strength, which may cause a rise in cost.

On the other hand, according to the saddle type vehicle in this exemplary embodiment, the knock pin or knock pins (81 and/or 81' and/or 82) are provided between the main frame 20 and the engine 50 in the vicinity of at least one of the fastening members 70. This ensures that the loads generated in the longitudinal vehicle direction at the time of such operations as starting and stopping of the vehicle can be received by the knock pin or pins. In addition, the operation of mounting the knock pin or pins is easier than the operation of fastening the fastening members 70.

Thus, according to the saddle type vehicle in this embodiment, a better workability and an enhanced productivity can be realized. In addition, it is possible to cope with the loads generated in the longitudinal vehicle direction at the time of such operations as starting and stopping of the vehicle, while suppressing the need for an increase in the strength of the fastening members 70 themselves.

(2) The main frame 20 and the seat rails 30 are separate bodies from each other, the fastening members 70 are provided in only the main frame 20, and the fastening members 70 are provided in a total of four positions, more specifically, front left, front right, rear left, and rear right positions of a lower portion of the main frame 20. This configuration makes it possible to restrain external forces exerted on the main frame 20 from influencing the seat rails 30. It is also made possible to restrain external forces exerted on the seat rails 30 from influencing the main frame 20. Consequently, it is possible to more successfully cope with the loads generated in the longitudinal vehicle direction at the time of such operations as starting and stopping of the vehicle.

(3) The first knock pin or knock pins 81 disposed orthogonally to the vehicle width direction and/or the second knock pin or pins 82 disposed in the vehicle width direction are provided. By appropriately providing the first and second knock pins 81 and 82, it is possible to cope with loads in the longitudinal and transverse directions of the vehicle, and to prevent (at least extremely suppress) slippage on fitting surfaces (mating surfaces) F1.

(4) The first knock pins 81 are provided respectively downwardly of the fastening members 70 at two front-side ones or two rear-side ones of the fastening members 70 provided in four positions, more specifically, in the front left, front right, rear left, and rear right positions of the lower portion of the main frame 20. Therefore, slippage on the fitting surfaces F1 at the time of inputting of a reaction force from a road surface can be prevented, while minimizing a rise in cost.

If it is intended to provide the first knock pins 81 in all the four positions, a high accuracy between the component parts would be demanded, leading to a rise in cost.

Where the first knock pins 81 are disposed in the two front positions or two rear positions, on the other hand, slippage on the fitting surface F1 at the time of inputting of a reaction force from a road surface can be prevented, while minimizing a rise in cost.

(5) The second knock pins 82 are provided respectively downwardly of the fastening members 70 provided in the four positions, more specifically, in the front left, front right, rear left, and rear right positions of the lower portion of the main frame 20. In addition, each second knock pin 82 includes the male screw portion 82s for screw coupling to the female screw portion 20s provided in the main frame 20, and the fitting portion 82p provided on the tip side of the male screw portion 82s so as to be fitted to the fitting portion 50h provided in the engine 50. By the fitting between each of the second knock pins 82 and the engine 50, therefore, a force tending to cause a rotation of the main frame 20 about the fastening member 70 can be further suppressed.

In addition, although the second knock pins 82 are provided in the four positions, more specifically, in the front left, front right, rear left, and rear right positions, workability is not lowered because the second knock pins 82 are provided along the vehicle width direction. In addition, since the female screw portion 20s in the main frame 20 and the fitting portion 50h in the engine 50 are provided in the same direction, they can easily be produced with a high accuracy. Therefore, these components would not lead to an increase in cost.

(6) The first knock pin 81 is located between the fastening member 70 and the second knock pin 82 in the longitudinal vehicle direction. This means that the first knock pins 81 are provided in such positions that the spacing between the fitting surfaces F1 would not easily be enlarged when a force tending to cause slippage on the fitting surfaces F1 is exerted. Consequently, the preventive effect of the first knock pins 81 on slippage on the fitting surfaces F1 is enhanced.

(7) The engine 50 has the V-bank shape in which the cylinders 51 and 52 are arranged in a V-shape in side view. In addition, the rear portion 51r of the front bank 51 and the front portion 52f of the rear bank 52 are fastened to each other by the fastening members 70. Further, the fastening member 70, the first knock pin 81, and the second knock pin 82 are arranged in this order along the direction from the center line C1 of the V-bank shape toward the outer side in the longitudinal vehicle direction. Therefore, an external appearance which is symmetric with respect to the center line C1 of the V-bank shape can be obtained, and assembleability is enhanced.

(8) The mating surfaces F1 present between the main frame 20 and the engine 50 to house the first knock pins 81 are provided in the four positions, more specifically, in the front left, front right, rear left, and rear right positions. In addition, the mating surfaces F1 and the center line C1 of the V-bank shape are orthogonal to each other in a side view. Therefore, an external appearance which is symmetric with respect to the center line C1 of the V-bank shape can be obtained, and assembleability is enhanced.

(9) The intake funnel 53 is provided between the cylinders 51 and 52 that are arranged in the V-shape in a side view. The intake funnel 53 is opening into the air cleaner case 21 formed inside the main frame 20. The dirty side 21d of the air cleaner case 21 is provided with the water drain hole 22 through which to release water that would otherwise tend to accumulate in the dirty side 21d. This structure enables efficient utilization of the main frame 20.

(10) According to this saddle type vehicle, in which the pivot plates 40 are separate bodies from the seat rails 30, restrictions with regard to the weight and layout can be reduced. Consequently, the saddle type vehicle can be made slimmer and lighter in weight.

In the case where the pivot plates 40 and the seat rails 30 are separate bodies from each other as aforementioned, if a structure in which the upper end 61 of the shock absorber 60 is supported by the seat rails 30, for example, is adopted, the following problem would be generated. When a high load from the shock absorber 60 is inputted to the seat rails 30, the fitting surfaces in the fastening portions where the seat rails 30 are fastened to the main frame 20 and the pivot plates 40 may slip relative to each other, depending on the fastening structure. In such a situation, changes in dimension or in the rigidity of fastening may be brought about.

On the other hand, this saddle type vehicle has a structure wherein the seat rail 30 is attached to the main frame 20 at one front-side end 31 thereof and to the pivot plate 40 at the other front-side end 32 thereof. In addition, the main frame 20 and the seat rail 30 are provided with the first fastening portion 91 where they are fastened to each other in the vertical direction by the first fastening members 71. Also, the pivot plate 40 and the seat rail 30 are provided with the second fastening portion 92 where they are fastened to each other in the vehicle width direction by the second fastening members 72. This means that the seat rail 30 is provided with the first and second fastening portions 91 and 92 for fastening in different directions, namely, in the vertical direction and the vehicle width direction. Even when a high load is inputted, therefore, relative slippage on fitting surfaces F2 and F3 (see FIGS. 2(c) and 2(d)) in the fastening portions would not easily be generated. Accordingly, changes in the dimension or in the rigidity of fastening can be restrained effectively.

(11) The upper end 61 of the shock absorber 60 is connected to the seat rail 30 by the upper end connecting portion 93. In addition, the first fastening portion 91, the second fastening portion 92, and the upper end connecting portion 93 are arranged in this order from the front side of the vehicle in side view. When a load from the shock absorber 60 is inputted to the seat rail 30, therefore, the action of a force tending to rotate the seat rail 30 about the second fastening portion 92 where the fastening is in the vehicle width direction can be favorably received by the first fastening portion 91 where the fastening is in the vertical direction.

(12) Either the first fastening portion 91 or the second fastening portion 92 is provided with the knock pin 83, whereby either the first fastening portion 91 or the second fastening portion 92 can be freed from the possibility that a slipping load would be exerted on the fitting surfaces therein. In addition, with the knock pin 83 provided in only one of the first fastening portion 91 and the second fastening portion 92, it is possible to absorb discrepancies among component parts.

(13) In this exemplary embodiment, the knock pin 83 is provided in the first fastening portion 91. Since the fastening in the first fastening portion 91 is made in the vertical direction by the first fastening member 71, the knock pin 83 can easily be put in position from above. Accordingly, enhanced workability is secured.

(14) According to this saddle type vehicle, the pivot plate 40 and the seat rail 30 are separate bodies from each other. This ensures that restrictions with regard to the weight and layout can be reduced. Therefore, the saddle type vehicle can be made slimmer and lighter in weight.

Moreover, the upper end connecting portion 93 for the shock absorber 60 is provided on the cross member 100 located between the left and right seat rails 30. The cross member 100 is a separate body from the seat rails 30, and both its ends 101 are supported by the recesses 35 provided in the left and right seat rails 30 at the inner sides of the seat rails 30 so as to face each other. Further, the cross member 100 is fastened to the seat rails 30 by the cross member fastening members 73. Therefore, the material of the cross member 100, on which the load from the shock absorber 60 acts directly, can be made different from the material of the seat rails 30. Accordingly, it is possible, by raising the rigidity of only the cross member 100, to lighten the overall weight of the vehicle, and to enhance productivity.

For instance, the seat rails 30 may be a die casting of aluminum, whereas the cross member 100 may be a wrought product of aluminum. The wrought products of aluminum is three to four times higher in material strength than die castings of aluminum.

(15) The upper surface 35b of the recess 35 forms a fitting surface, and the upper surface 102 of the cross member 100 makes contact with this fitting surface 35b. The cross member fastening member 73 has only its tip portion 73s with a screw coupling to the screw receiving portion 37 provided in an upper portion of the seat rail 30, and has its other portion and head portion 73h fitted in the through-hole 107 provided in the cross member 100 and to a lower portion of the seat rail 30. This configuration ensures that the load from the shock absorber 60 can be received mainly by the fitting surface 35b so that no high load will be exerted on the screw coupling portion (73s, 37).

(16) The seat rails 30 are each produced using a mold whose mold parting direction coincides with the vehicle width direction, whereas the cross member 100 is composed of an extruded member or is produced using a mold whose mold parting direction coincides with the vertical direction. This produces the following effects.

Where the cross member 100, which receives the upper end 61 of the shock absorber 60, and the seat rails 30 are separate bodies from each other, the cross member 100 and the seat rails 30 can be produced using respective molds which are different in the mold parting direction.

Therefore, a required strength can be secured while realizing a lighter overall weight.

More particularly, a configuration may be adopted wherein the seat rails 30 are each molded using a mold whose mold parting direction coincides with the vehicle width direction, whereas the cross member 100 is composed of an extruded member or is produced using a mold whose mold parting direction coincides with the vertical direction. In this case, the extrusion direction or the mold parting direction relevant to the cross member 100 can be substantially conformed to the direction in which the load from the shock absorber 60 is received. Therefore, a required strength can be secured while rendering the cross member 100 lighter in weight. In addition, on an overall structure basis, a required strength can be secured while realizing a lighter weight.

Further, regarding the seat rail 30, a reinforcement rib 38 projected inwardly in the vehicle width direction or the like portion can be easily produced. In regard to the cross member 100, the ribs 104L and 104R can be easily produced.

(17) The seat rail 30 is Y-shaped in a side view, and the first fastening portion 91 and the second fastening portion 92 are provided at end portions of the arms of the Y-shape. Therefore, a portion S1 between the arms of the Y-shape (see FIG. 2(b)) can be made to be void, so that the seat rail 30 can be made lighter in weight.

(18) The first fastening member 71, as shown in FIG. 2(c'), may be configured so that the fastening at the first fastening portion 91 is made obliquely from the outside toward the inside in the vehicle width direction, as viewed from the front side of the vehicle. In this case, the fastening operation is facilitated.

(19) The shock absorber 60 is connected to the cross member 100 by the shock absorber connecting member 74 provided along the vehicle width direction. In addition, the seat rail 30 is provided therein with the tool insertion hole 36 on the extension line of the axial direction of the shock absorber connecting member 74. Therefore, the shock absorber 60 can be easily removed while operating from the outer side in the vehicle width direction, by way of the tool insertion hole 36 provided in the seat rail 30.

(20) The shock absorber 60 is disposed in a position with an offset from the vehicle body center line C2 toward the side from which the shock absorber connecting member 74 is inserted. Therefore, the shock absorber 60 can be further easily removed while operating from the outer side in the vehicle width direction, by way of the tool insertion hole 36 provided in the seat rail 30.

(21) The cross member 100 is provided, on the outer sides in the vehicle width direction of its connecting portion (93) for connection to the shock absorber 60, with the left and right lightening holes 103L and 103R that are different in size. Each of the lightening holes 103L and 103R is provided with the rib 104L and 104R on its diagonal line. The thickness t2 of the rib 104R of the larger lightening hole 103R is greater than the thickness t1 of the rib 104L of the smaller lightening hole 103L. Therefore, it is possible to restrain the deformation of the cross member 100, which is liable to be inclined due to a load inputted from the shock absorber 60 disposed with an offset as aforementioned.

(22) The cross member fastening members 73 are mounted substantially in parallel to the axis a1 of the shock absorber 60 in side view. Therefore, the load from the shock absorber 60 can be efficiently received by the cross member 100 and the seat rails 30.

(23) Each seat rail 30 is attached to the main frame 20 at its one front-side end 31 and to the pivot plate 40 at its other front-side end 32. In addition, the lower end 62 of the shock absorber 60 is attached to the engine 50 and the swing arm 5 through the link member 63. Therefore, mounting of the seat rails 30 to the engine 50, which is a rigid member, can be avoided. This, together with the fact that the lower end 62 of the shock absorber 60 is attached to the engine 50 and the swing arm 5 through the link member 63, makes it possible to secure shock absorbering properties in the vehicle as a whole.

While the exemplary embodiment of the present invention has been described above, the invention is not limited to the above embodiment, and various modifications can be made, as required, within the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
   a head tube;
   a main frame extending rearwardly from the head tube;
   left and right seat rails adapted to support a seat, the seat rails being provided as separate bodies from the main frame and located rearwardly of the main frame;
   a swing arm adapted to support a rear wheel;
   pivot plates adapted to support a pivot serving as a center of swinging of the swing arm; and
   a shock absorber for suppressing vibrations attributable to a road surface;
   wherein the pivot plates are provided as separate bodies from the seat rails;
   an upper end of the shock absorber is received by a cross member located between the left and right seat rails;
   wherein the shock absorber is connected to the cross member by a shock absorber connecting member provided along the vehicle width direction; and
   the seat rail is provided therein with a tool insertion hole on an extension line of an axis of the shock absorber connecting member.

2. The saddle vehicle according to claim 1, wherein the shock absorber is disposed in a position with an offset from a vehicle body center line toward a side from which the shock absorber connecting member is inserted.

3. The saddle vehicle according to claim 2,
   wherein the cross member is provided, on outer sides in the vehicle width direction of its connecting portion for connection to the shock absorber, with left and right lightening holes which are different in size;
   the lightening holes are each provided with a rib on a diagonal line thereof; and a thickness of the rib of the larger lightening hole is greater than a thickness of the rib of the smaller lightening hole.

4. The saddle vehicle according to claim 1, wherein cross member fastening members are mounted substantially in parallel to an axis of the shock absorber in a side view.

5. The saddle vehicle according to claim 1,
wherein the seat rail is attached to the main frame at one front-side end thereof and to the pivot plate at another front-side end thereof; and
a lower end of the shock absorber is attached to an engine and the swing arm by way of a link member.

6. A saddle vehicle comprising:
a head tube;
a main frame extending rearwardly from the head tube;
left and right seat rails adapted to support a seat, the seat rails being provided as separate bodies from the main frame and located rearwardly of the main frame;
a swing arm adapted to support a rear wheel;
pivot plates adapted to support a pivot serving as a center of swinging of the swing arm;
a shock absorber for suppressing vibrations attributable to a road surface;
wherein an upper end of the shock absorber is received by a cross member located between the left and right seat rails; and
the cross member is a separate body from the seat rails, both ends of the cross member being supported by recesses which are provided in the left and right seat rails at inner sides of the seat rails so as to face each other, and the cross member being fastened to the seat rails by cross member fastening members;
wherein the shock absorber is connected to the cross member by a shock absorber connecting member provided along the vehicle width direction; and
the seat rail is provided therein with a tool insertion hole on an extension line of an axis of the shock absorber connecting member.

7. The saddle vehicle according to claim 6,
wherein the seat rails are each produced using a mold having a mold parting direction that coincides with a vehicle width direction; and
the cross member is produced using a mold having a mold parting direction that coincides with a vertical direction or in a longitudinal vehicle direction.

8. The saddle vehicle according to claim 6, wherein the cross member fastening members are mounted substantially in parallel to an axis of the shock absorber in a side view.

9. A saddle vehicle comprising:
a head tube;
a main frame extending rearwardly from the head tube;
seat rails adapted to support a seat, said seat rails being provided as separate bodies from the main frame and located rearwardly of the main frame;
a swing arm adapted to support a rear wheel;
pivot plates adapted to support a pivot serving as a center of swinging of the swing arm; and
a shock absorber for suppressing vibrations attributable to a road surface;
wherein the pivot plates are provided as separate bodies from the seat rails;
each seat rail is attached to the main frame at one front-side end thereof and to the pivot plate at another front-side end thereof;
the main frame and the seat rail are provided with a first fastening portion where they are fastened to each other in a vertical direction by a first fastening member; and
the pivot plate and the seat rail are provided with a second fastening portion where they are fastened to each other along a vehicle width direction by a second fastening member;
wherein either the first fastening portion or the second fastening portion is provided with a knock pin.

10. The saddle vehicle according to claim 9, wherein an upper end of the shock absorber is connected to the seat rail by an upper end connecting portion; and
the first fastening portion, the second fastening portion, and the upper end connecting portion are arranged in this order from a front side of the vehicle, in a side view.

11. The saddle vehicle according to claim 10, wherein the upper end connecting portion for the shock absorber is provided on a cross member located between the left and right seat rails; and
the cross member is a separate body from the seat rails, has both its ends supported by recesses which are provided in the left and right seat rails at inner sides of the seat rails so as to face each other, and is fastened to the seat rail by a cross member fastening member.

12. The saddle vehicle according to claim 11, wherein the seat rail is produced using a mold having a mold parting direction that coincides with the vehicle width direction; and
the cross member is produced using a mold having a mold parting direction that coincides with the vertical direction.

13. The saddle vehicle according to claim 10, wherein the seat rail is Y-shaped in a side view, and the first fastening portion and the second fastening portion are provided at end portions of arms of the Y-shape.

14. The saddle vehicle according to claim 9, wherein the knock pin is provided in the first fastening portion.

15. The saddle vehicle according to claim 9, wherein the upper end connecting portion for the shock absorber is provided on a cross member located between the left and right seat rails; and
the cross member is a separate body from the seat rails, has both its ends supported by recesses which are provided in the left and right seat rails at inner sides of the seat rails so as to face each other, and is fastened to the seat rail by a cross member fastening member.

16. The saddle vehicle according to claim 9, wherein the seat rail is Y-shaped in a side view, and the first fastening portion and the second fastening portion are provided at end portions of arms of the Y-shape.

17. The saddle vehicle according to claim 9, wherein the first fastening member is configured so that fastening at the first fastening portion is made obliquely from an outside toward inside in the vehicle width direction, as viewed from a front side of the vehicle.

* * * * *